April 22, 1924.
E. E. EHRICH ET AL
1,491,226
HEAT EQUALIZER FOR DRY ROOMS
Filed March 13, 1922
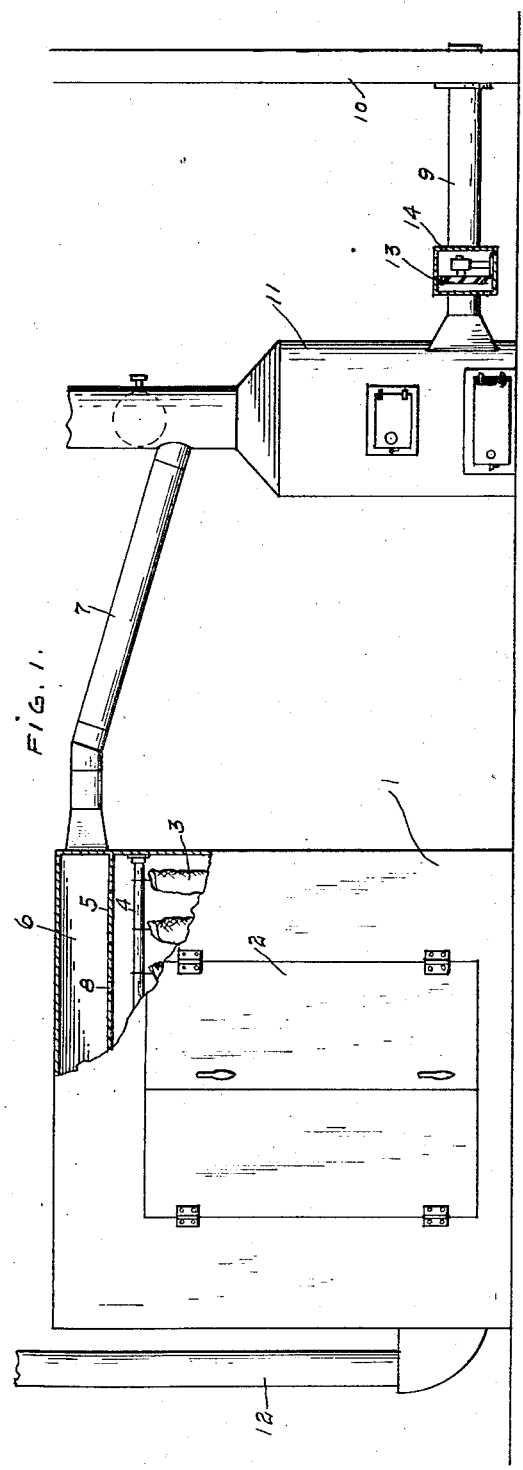
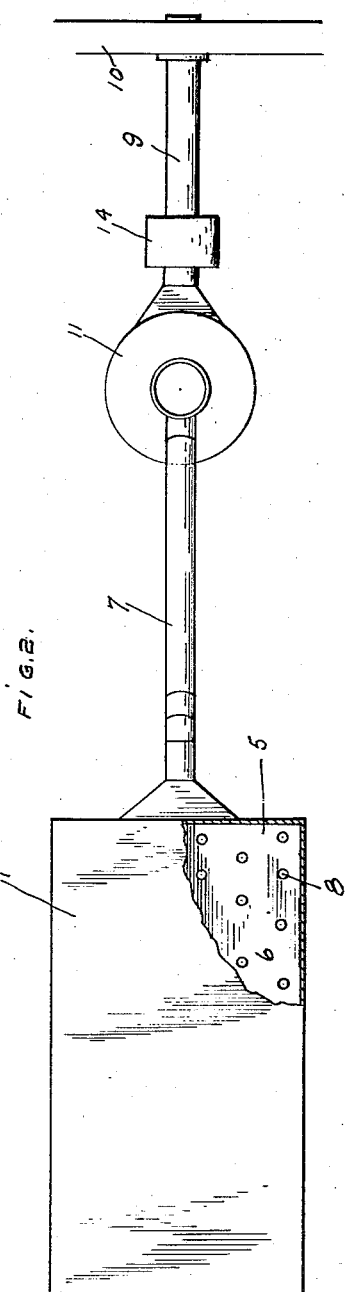
INVENTORS
EDWARD E. EHRICH
CHESTER P. EHRICH
BY
ATTORNEY Patented Apr. 22, 1924.

1,491,226

UNITED STATES PATENT OFFICE.

EDWARD E. EHRICH AND CHESTER P. EHRICH, OF INDIANAPOLIS, INDIANA.

HEAT EQUALIZER FOR DRY ROOMS.

Application filed March 13, 1922. Serial No. 543,467.

*To all whom it may concern:*

Be it known that we, EDWARD E. EHRICH and CHESTER P. EHRICH, citizens of the United States, residing at Indianapolis, in the county of Marion and State of Indiana, have invented certain new and useful Improvements in Heat Equalizers for Dry Rooms, of which the following is a specification.

This invention relates to heat equalizers for dry rooms and is designed primarly for use in connection with dry rooms employed for drying gasoline cleaned garments and is an improvement over Patent No. 1,256,887, granted February 19, 1918, to Edward E. Ehrich, and the prime feature of the present invention is the provision of means for conveying heated air and discharging the same into the upper end of the dry room or cabinet.

A further feature of the invention is the provision of a baffle for equally distributing the heated air over the entire surface of the dry room.

And a further feature of the invention is the provision of means for creating a forced circulation of the heated air through the dry room or cabinet.

Other objects and advantages will be hereinafter more fully set forth and pointed out in the accompanying specification.

In the accompanying drawings,

Figure 1 is a side elevation of the dry room and heating apparatus attached thereto with parts broken away, and Figure 2 is a top plan view thereof with parts broken away.

Referring to the drawings, 1 indicates a dry room or cabinet which may be constructed in any suitable manner and having doors 2 in one face thereof for the introduction of the garments into the cabinet, the garments 3 being suspended in any suitable manner from a pole 4 extending from end to end of the dry room. Located in the upper portion of the dry room 1 at a point above the pole 4 is a baffle or partition 5 which is spaced from the upper wall of the dry room to form a compartment 6 into which is discharged heated air from a pipe 7, and in order to properly distribute the heated air over the entire surface of the dry room 1, so that the heat will be uniform throughout the dry room, the baffle 5 is provided with a plurality of openings 8 through which the heated air passes in entering the body of the dry room. By providing a plurality of openings 8, which tend to retard the flow of the heated air when first introduced into the compartment 6, the compartment will be filled with heated air from end to end and the heated air will then pass through the openings 8 into the body of the dry room, and as the heated air extends from end to end of the compartment the heat within the dry room will be uniform in all parts thereof.

The baffle 5 not only serves to distribute the heated air uniformly to all parts of the dry room, but also reduces to a minimum the possibility of heat from the heating element causing an explosion of the gases within the dry room. The air which is conveyed into the dry room is preferably taken from the exterior of the building in which the dry room is located by extending a pipe 9 through the wall 10 of the building, the air in its passage through the pipe 9 into the pipe 7 being passed through a heating element 11 which may be in the form of a hot air furnace or may be electrically or otherwise heated, and after the air passes through the dry room it passes to the outer atmosphere through a ventilator 12 which is connected to the dry room 1 adjacent the lower end thereof, the ventilator extending to any suitable discharge point for conveying the fumes within the dry room to the outer atmosphere.

Owing to the fact that the fumes from the gasoline is heavier than the atmosphere, it will naturally descend into the lower portion of the dry room and as it is the tendency of heated air to arise, it is preferable to provide means at some point in the system such as in the pipe 9 for creating a forced circulation through the cabinet for causing the heated air to descend and force the fumes in the lower portion of the dry room outwardly through the ventilator. Any suitable means may be provided for this purpose, but in the present instance a fan 13 is mounted in a housing 14 connected with the pipe 9, said fan when in operation, causing the heated air to positively circulate through the baffle and descend into the dry room and force the fumes therein through the ventilator, and as the heated air comes in direct contact with the garments, said garments will be very thoroughly dried and the fumes of the gasoline fully removed therefrom, and by providing the forced circulation the garments may be more rapidly dried and the fumes removed than would be possible with the present mode of treating the garments within the dry room.

It will be readily understood that the fan may be located in the length of the ventilator 12 instead of within the pipe 9, if desired, and that the results obtained will be practically the same.

Having thus fully described our said invention, what we claim as new and desire to secure by Letters Patent, is:

The combination with a dry room and a baffle in the upper portion of the dry room for forming a compartment, of a pipe for conveying heated air into said compartment, a heating element connected with said pipe, a second pipe for conveying fresh air to the heating element, a fan interposed in said second pipe for causing the fresh air to circulate through the heating element into all parts of the dry room, and a ventilator connected adjacent the floor of the room and on the opposite side thereof from that conveying the heated air into said compartment said ventilator being adapted to conduct away from the dry room the vaporous contents, substantially as set forth.

In witness whereof, we have hereunto set our hands and seals at Indianapolis, Indiana, this 9th day of March, A. D. nineteen hundred and twenty-two.

EDWARD E. EHRICH. [L. S.]
CHESTER P. EHRICH. [L. S.]

Witnesses:
CAREY S. FRYE,
M. L. SHULER.